United States Patent
Onomatsu et al.

(10) Patent No.: US 7,805,743 B2
(45) Date of Patent: Sep. 28, 2010

(54) BROADCAST RECEIVER

(75) Inventors: Takehiro Onomatsu, Osaka (JP); Shusuke Narita, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1138 days.

(21) Appl. No.: 11/178,225

(22) Filed: Jul. 8, 2005

(65) Prior Publication Data

US 2006/0015910 A1    Jan. 19, 2006

(30) Foreign Application Priority Data

Jul. 9, 2004    (JP)    ............... P2004-203133

(51) Int. Cl.
H04N 7/20    (2006.01)
(52) U.S. Cl. ............................................. 725/72
(58) Field of Classification Search .................... 725/72
See application file for complete search history.

(56) References Cited

U.S. PATENT DOCUMENTS 6,580,452 B1 * 6/2003 Gangitano ................ 348/180

2002/0036718 A1 * 3/2002 Lee ............................ 348/731
2002/0051085 A1 * 5/2002 Lee ............................ 348/570

FOREIGN PATENT DOCUMENTS

JP    11-298226    10/1999
JP    2004-15800    1/2004

OTHER PUBLICATIONS

Patent Abstracts of Japan, Publication No. 11-298226, Publication Date Oct. 29, 1999, 1 page.
Patent Abstracts of Japan, Publication No. 2004-015800, Publication Date Jan. 15, 2004, 1 page.

* cited by examiner

*Primary Examiner*—Brian T Pendleton
*Assistant Examiner*—Cai Chen
(74) *Attorney, Agent, or Firm*—Osha • Liang LLP (57) ABSTRACT

When a channel of a digital TV broadcasting is selected, a direction information of the channel, which is stored in a channel setting table, is set in a smart antenna and then, in a case of a signal absence state of a broadcasting signal or when a reduction of receiving signal intensity is detected, an optimal directivity direction, in which the broadcasting signal is reproducible and the receiving state of the wave is optimal, is determined by switching (scanning) the directivity direction of the smart antenna. And, the determined directivity direction is stored in the channel setting table as the direction information of a current channel and the directivity direction is set in the smart antenna.

3 Claims, 5 Drawing Sheets

BROADCAST RECEIVER

BACKGROUND OF THE INVENTION

1. Field of the Invention

The present invention relates to a broadcast receiver for receiving a broadcasting of a predetermined channel transmitted from a broadcasting station by using a directivity switching antenna.

2. Description of the Related Art

In the USA, etc., an individual ordinary home is usually surrounded by a plurality of interspersed broadcasting stations (or base stations). In order to make reception of broadcasts from all of such broadcasting stations possible under such circumstances, it has been proposed to control directivity of an antenna by providing a plurality of antenna elements on the antenna and changing amplitude and phase of radio wave to be received by the antenna elements (for example, JP-A-11-298226 (paragraphs 0008 to 0010)). In JP-A-11-298226, when a channel of a TV receiver is switched to another, the directivity of antenna is scanned omnidirectionally from 0° to 360° to search a directivity direction of the antenna in which maximum receiving power level is obtained. When such directivity direction is obtained, the directivity of the antenna is controlled such that the directivity of the antenna is fixed to the directivity direction thus obtained.

On the other hand, in a radio LAN (Local Area Network) system, in which data and sound, etc., are sent and received, it has been proposed to provide a smart antenna having a directivity capable of being switched on a device such as a personal computer (for example, JP-A-2004-15800 (paragraphs 0043 to 0119 and FIG. 2)). In JP-A-2004-15800, parameters of the smart antenna are stored in a memory of the device as information for keeping the receiving characteristics such as receiving signal intensity and bit error rate of the receiving signal in an acceptable state. In starting a communication, the parameters stored in the memory are set in the smart antenna and the communication is performed. During the communication, the device monitors the receiving characteristics and, when it is detected that the receiving characteristics become lower than a reference value of performance, the smart antenna is scanned to search a direction in which the receiving characteristics become better. The directivity of the smart antenna is kept to the better direction and parameters with which the better direction is obtained are stored in the memory.

SUMMARY OF THE INVENTION

However, in JP-A-11-298226, the search (scan) for directivity of the antenna is performed every time when the channel is switched in such a way that a best image is obtained. Therefore, there is a problem that a time period from a time when the channel is switched to a time when the best image is obtained becomes long and a user may be irritated. Further, in a case where the receiving state becomes worth after a certain time lapses from the channel switching, there is a problem that an image, which is not always acceptable, is continuously displayed on the TV receiver.

On the other hand, although JP-A-2004-15800 describes that the above mentioned matter can be applied to a digital TV system utilizing a smart antenna, it is unclear whether it means that the digital TV system is used in a radio LAN system or that a digital TV signal broadcasted from a broadcasting station is received. Further, there is no description about channels of digital TV broadcasting.

The present invention was made to solve the above mentioned problems and an object of the present invention is to provide a broadcast receiver, with which an acceptable receiving state can be obtained immediately and, when the broadcasting receiving state is bad, a broadcasting wave can be received in a predetermined goodness by switching the directivity direction of the directivity switching antenna.

According to one aspect of the present invention, there is provided a broadcast receiver for receiving broadcasting transmitted from a plurality of broadcasting stations through respective receiving channels by a directivity switching antenna having directivity switchable between a plurality of directivity directions, includes: a control unit for switching the directivity direction of the directivity switching antenna and controlling the broadcast receiver; a memory unit for storing a channel information of the respective receiving channels with a corresponding direction information of directivity directions of the directivity switching antenna capable of receiving the television broadcasting of the respective channels; and a detector unit for detecting receiving states of broadcasting signals in the respective receiving channels. When any one of the channels stored in the memory is selected, the control unit reads out the direction information of the selected channel from the memory and sets the direction information of the selected channel in the directivity switching antenna. Also, when the detector unit detects badness of the receiving state of the broadcasting signal in the selected channel, the control unit continuously receives the broadcast signal while switching the directivity direction of the directivity switching antenna to determine a directivity direction of the directivity switching antenna, in which the broadcasting signal in the channel is received with predetermined goodness and, when the directivity direction of the directivity switching antenna is determined, the control unit stores the determined directivity direction in the memory unit as the direction information of the selected channel and sets the direction information of the selected channel in the directivity switching antenna.

As mentioned above, when any one of the channels stored in the memory unit is selected, the control unit reads out the direction information of the selected channel from the memory unit and sets the thus read out direction information in the directivity switching antenna. That is, when the receiving state of the broadcasted signal in the selected channel is acceptable, the search (scan) of the directivity direction of the antenna is not performed after the channel is switched as in the technique disclosed in JP-A-11-298226. Therefore, it is possible to receive (look and listen) the broadcasting in the selected channel immediately in the good receiving state. Further, when the receiving state of the signal broadcasted in the selected channel is bad from a time when the channel is selected or when the receiving state becomes unacceptable (worse) from a certain time after the channel is selected, the control unit continuously receives the broadcasting in the channel while switching the directivity direction of the directivity switching antenna to determine the directivity direction in which the broadcasting in the channel is received with predetermined goodness and, when the directivity direction is determined, the control unit stores the determined directivity direction in the memory unit as the direction information of the channel (that is, the direction information stored in the memory unit is updated by the determined directivity direction) and sets it in the directivity switching antenna. Therefore, it becomes possible to automatically receive the broadcasted signal in the selected channel with predetermined goodness, without necessity of manual operation. When the selected channel is selected again at a later time, it is possible to immediately receive (look and listen) the broadcasting in the re-selected channel with the predetermined goodness since the updated direction information is set in the directivity switching antenna.

In an embodiment of the present invention, in switching the directivity direction of the directivity switching antenna, the control unit displays, on a display unit, that the directivity direction is being switched.

When the switching (scanning) of the directivity direction is performed during the receiving of the broadcasting as mentioned above, snow noise possibly occurs on the display or noise sound is possibly outputted during the scanning. However, by displaying, on the display unit, that the directivity direction is being switched, it is possible for a user to visually recognize the scanning to thereby prevent the user's feeling of uneasiness on malfunction of the broadcast receiver. Incidentally, the display unit is a monitor of a television receiver in the case of the broadcast receiver for receiving the television broadcasting or a display panel of an operating unit, etc., in the case of the broadcast receiver for receiving radio broadcasting.

In another embodiment of the present invention, a broadcast receiver, which receives television broadcasting in channels broadcasted from a plurality of broadcasting stations by using a smart antenna having directivity switchable between a plurality of predetermined directions, includes: a control unit for switching the directivity direction of the smart antenna and controlling the broadcast receiver; a memory unit for storing a channel information of the respective receiving channels with a corresponding direction information showing directivity directions of the smart antenna capable of receiving the television broadcasting in the respective channels; and a detector unit for detecting a receiving state of television signal in each channel. When any one of the channels stored in the memory is selected, the control unit reads out the direction information corresponding to the selected channel from the memory unit and sets the direction information in the smart antenna. When the detector unit detects badness of receiving state of the broadcasting signal in the selected channel, the control unit continuously receives the television broadcasting in the selected channel while switching the directivity direction of the smart antenna. When the directivity direction, in which the television broadcasting in the channel is received with predetermined goodness, can be determined, the control unit stores the determined directivity direction in the memory unit as the direction information of the selected channel and sets it in the smart antenna. On the other hand, in the above case, when a new channel is selected in a state where it is impossible to determine the directivity direction in which the television broadcasting in the selected channel is received with predetermined goodness, the control unit suspends the switching of directivity direction, reads out a direction information of the newly selected channel from the memory unit and sets the direction information in the smart antenna. Further, in switching the directivity direction, the control unit displays, on the television receiver, that the directivity direction is being switched.

As mentioned above, when any one of the channels stored in the memory unit is selected and the receiving state of the broadcasting signal of the television broadcasting in the selected channel is acceptable, it is possible to immediately look and listen the broadcasting in the selected channel in acceptable state. When the receiving state of the signal broadcasted in the selected channel is unacceptable at a time when the channel is selected or when the receiving state becomes unacceptable (worse) at a certain time after the channel is selected, it is possible to automatically receive the broadcasted signal in the selected channel with predetermined goodness, without necessity of manual operation. On the other hand, in the above mentioned case, when the determination of the directivity direction in which the television broadcasting in the selected channel is received with predetermined goodness is impossible and a new channel is selected, the control unit suspends the switching of the directivity direction, reads out the direction information of the selected new channel from the memory unit and sets it in the smart antenna. Therefore, it is possible to immediately receive the television broadcasting in the new channel in acceptable state. When the switching (scanning) of directivity direction is further performed during the receiving of the television broadcasting, snow noise often occurs on the display of the television receiver during the scanning. However, by displaying, on the television receiver, that the directivity direction is being switched, it is possible for a user to visually recognize the scanning, so that it is possible to prevent the user's feeling of uneasiness on malfunction of the broadcast receiver from occurring.

According to the present invention, it is possible to immediately look and listen a broadcasting in a selected channel when the receiving state in the selected channel is acceptable and, even when the receiving state becomes worse during the receiving of the broadcast signal, the directivity direction of the directivity switching antenna is automatically switched and the broadcast wave can be received in acceptable state.

DETAILED DESCRIPTION OF THE PREFERRED EMBODIMENTS

Figure 1:
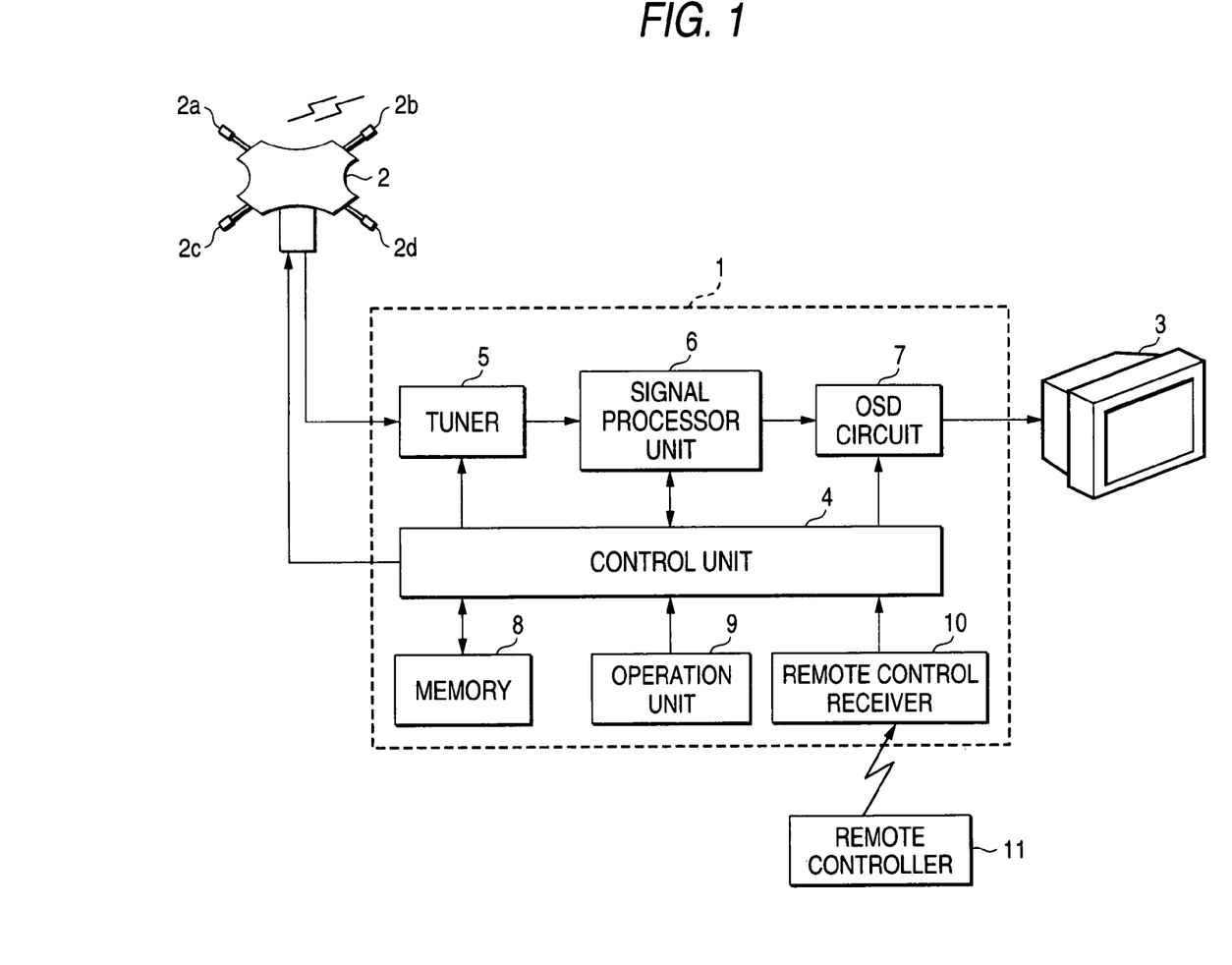
FIG. 1 is a block diagram showing a receiving system of a television broadcasting.

FIG. 1 is a block circuit diagram showing a receiving system of a television broadcasting (referred to as "TV broadcasting", hereinafter). A broadcasting receiver 1 and a television receiver (referred to as "TV set", hereinafter) 3 are located within a house of an ordinary family and connected to each other by a cable. A smart antenna 2 is mounted on a roof of the house, etc., and connected to the broadcast receiver 1 through a cable. The smart antenna 2 is an example of the antenna whose directivity direction can be switched (referred to as "directivity switching antenna", hereinafter) and, according to the standards, the directivity thereof can be switched between 16 radial directions. Further, the smart antenna 2 is equipped with four (4) antenna elements 2a to 2d, phase shifters provided correspondingly to the respective antenna elements 2a to 2d, a synthesizer and a control circuit, etc., (the other components than the antenna elements 2a to 2d are not shown). The directivity of the smart antenna 2 is electrically switched between 16 radial directions by controlling phases of signals received by the respective antenna elements 2a to 2d by the respective phase shifters and synthesizing the phase controlled signals by the synthesizer. In the following description, the broadcast receiver 1 will be described as a broadcast receiver for receiving digital television broadcasting.

Figure 2:
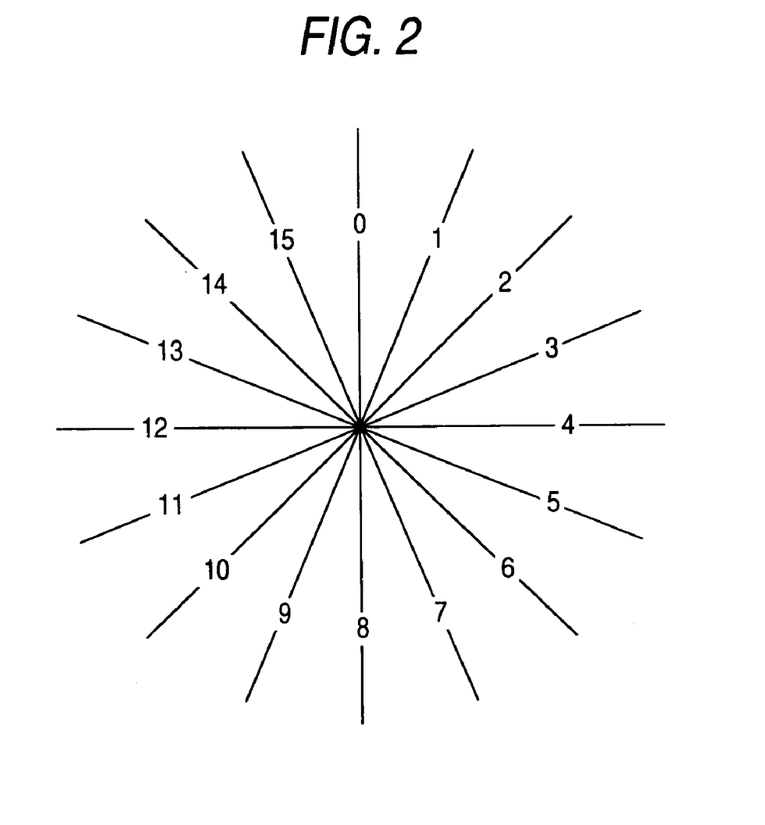
FIG. 2 shows a directivity direction of a smart antenna.

FIG. 2 is a diagram showing the directivity of the smart antenna 2. Straight lines in FIG. 2 show directivity directions of the smart antenna 2, between which the directivity of the antenna can be switched, and a point at which each straight line intersects shows the center of the smart antenna 2. Straight line numbers 0 to 15 indicate the respective directivity directions. That is, the directivity of the smart antenna 2 can be switched to anyone of the 16 directions, which are equally separated from each other by 360°/16. The control unit 4 of the broadcast receiver 1 controls the smart antenna 2 such that the smart antenna 2 can receive digital television broadcasting waves, which are broadcasted by a plurality of broadcasting stations, in the best state, respectively, that is, the directivity direction of the smart antenna 2 is switched to an optimal direction.

The control unit 4 is constituted with a CPU, a ROM and a RAM, etc. In the ROM, a control program and control data are stored (set). Further, channel numbers of all television broadcasting channels, which are receivable, (referred to as "candidate channels for receiving", hereinafter) together with signal frequency bands corresponding to the respective candidate channels for receiving are set in the ROM. The control unit 4 sets the information of the channel numbers of the candidate channels for receiving and the corresponding signal frequency bands in the control circuit of the smart antenna 2 after the broadcasting receiver 1 and the smart antenna 2 are connected to each other by the cable at a time when, for example, they are fixed in the house. In the RAM, the control data are stored readably and rewritably. The control unit 4 controls the respective units of the broadcasting receiver 1 and performs a switching control of the directivity direction of the smart antenna 2, by executing the program.

A tuner 5 extracts a TV broadcasting signal of a selected channel from TV broadcasting waves received by the smart antenna 2. A signal processor unit 6 generates a video signal and an audio signal by processing the TV broadcasting signal outputted from the tuner 5 and outputs the thus generated video and audio signals to the TV set 3. An OSD circuit 7 superposes an image data signal on the video signal such that the image data outputted from the control unit 4 can be displayed on the TV set 3 as OSD (on-screen display). The TV set 3 processes the video signal and the audio signal outputted from the OSD circuit 7, displays an image on a monitor and outputs sound from a loud speaker. An operating unit 9 is equipped with various keys such as channel keys and a power source switch. A remote controller 11 is equipped with various keys such channel keys, a decision key and a cursor key, etc. When any one of the keys of the remote controller 11 is depressed, a signal corresponding to the depressed key is transmitted to the control unit 4 through a remote control signal receiving unit 10.

Figure 3:
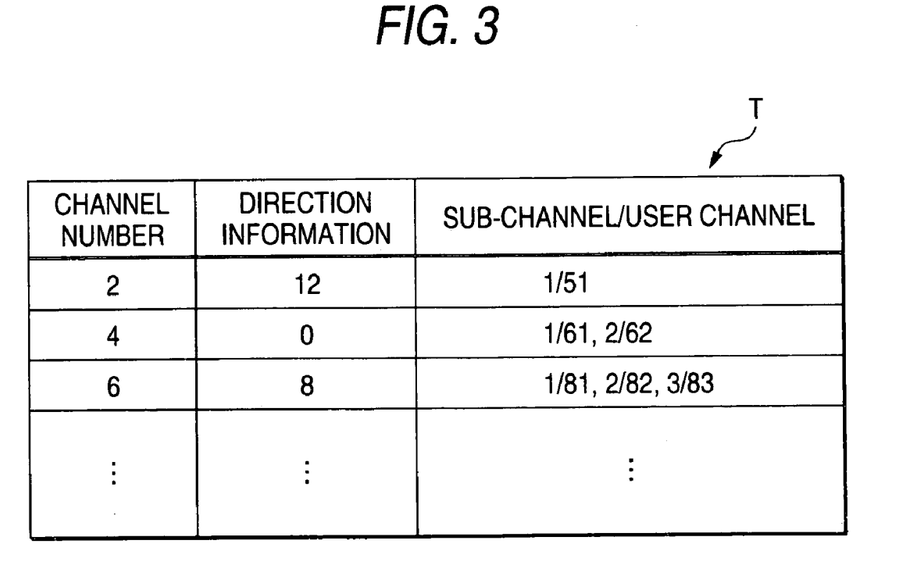
FIG. 3 shows an example of a channel setting table.

FIG. 3 shows an example of a channel setting table stored in a non-volatile memory 8. Although the channel setting table T shown in FIG. 3 is for a digital TV broadcasting, a similar channel setting table is used when only analog TV broadcasting or both the analog TV broadcasting and the digital TV broadcasting are to be received. The channel setting table T is generated by, for example, an all channel setting processing, which is performed when the broadcasting receiver is installed initially. In the channel setting table T, channel information including channel numbers and sub-channel/user channels and direction information corresponding thereto are stored.

The channel number (such as channel number 2) is the number of the digital TV broadcasting channel, which is to be received by the broadcasting receiver 1, and is the number of the channel among the candidate receiving channels set in the ROM, in which broadcasting wave is received by the broadcast receiver 1. The direction information indicates the directivity direction of the smart antenna, which is optimal for receiving the digital TV broadcasting of the channel, that is, one of the directivity directions numbered 0 to 15. Now, the sub-channel/user channel will be described. In the digital TV broadcasting, a broadcasting signal in one channel includes broadcasting signals of a plurality of sub-channels separably. Further, a broadcasting signal in one channel also includes numbers (referred to as "user channel numbers", hereinafter), each of which is assigned by the remote controller 11, etc., when one of the sub-channels is to be selected. Further, user channel numbers of respective sub-channels of each channel are stored in the sub-channel/user channel column. The user channel number for each sub-channel is extracted by the previously mentioned signal processing unit 6 and sent to the control unit 4.

The channel setting table T shows that, for example, the digital TV broadcasting in the channel number 6 includes sub-channels 1 to 3, that the signal in the channel 6 is received in the best state when the directivity direction of the smart antenna 2 is set to 8 and that user channel numbers of the sub-channels are 81 to 83, respectively. Incidentally, in the analog TV broadcasting, there is no sub-channel. In a case where both of the digital TV broadcasting and the analog TV broadcasting are to be received by the broadcasting receiver 1, it may be possible to include data for identifying the kind of TV broadcasting, digital TV broadcasting or analog TV broadcasting, as channel information. Further, the channel setting table T in the case of the previously mentioned all channel setting processing is generated by reading out numbers of the candidate channels for receiving sequentially from the ROM, and, when the channels thus read out are receivable, sequentially setting the numbers of the receivable channels, the directivity directions of the smart antenna 2, in which the digital TV broadcasting of the receivable channels are received in the best receiving state, and the user channel numbers of the respective sub-channels in the channel setting table T.

Next, an operation of the broadcasting receiver 1 will be described under an assumption that the receiving channels are set in the channel setting table T as shown in FIG. 3. First, it is further assumed that the remote controller 11 is operated and any one of the channels set in the channel setting table T, for example, the sub-channel 2 of the channel 6 (expressed by "channel 6-2", hereinafter) is selected. The control unit 4 notifies the smart antenna of the channel number (6 in this case) and the direction information of the same channel (direction 8 in this case). Upon the notice of these data, the control circuit of the smart antenna 2 sets the respective units of the antenna such that radio wave in the frequency band corresponding to this channel number can be received and switches the directivity direction of the smart antenna 2 to the assigned direction (direction 8 in this case). Further, the control unit 4 sets this channel in the tuner 5. Thus, the receiving of the broadcasting of the selected channel becomes possible and a video image in the channel (channel 6-2 in this case) is displayed on the monitor of the TV set 3.

During a time period in which a digital TV broadcasting is received, the signal processor unit 6 monitors as to whether a broadcasting signal is present or absent (including a case where the signal intensity of the broadcasting signal is very low) or whether or not the signal intensity of the broadcasting signal is lowered. That is, the signal processor unit 6 monitors as to whether or not the receiving state of the broadcasting signal is unacceptable. In this description, the signal absence state means, for example, a state where snow noise appears on a whole image screen of the TV set 3. Such phenomenon occurs when a broadcasting time is over and there is no radio wave transmitted from a broadcasting station or when almost no broadcasting wave is received due to an influence of a building, which might be newly built. Such signal absence state is detected when the signal level of the broadcasting signal is reduced to a predetermined reference value or lower. On the other hand, the reduction of signal intensity means, for example, a state where, although an image can be recognized, the receiving state can not be the as acceptable state due to noise mixed in the image. The reduction of signal intensity occurs when the receiving state of broadcasting wave is influenced by rain or when the receiving of the broadcasting wave is adversely influenced by a building, which is newly built. This signal intensity reduction is detected when bit error rate of the broadcasting signal becomes a predetermined value or higher. When the signal absence state or the reduction of signal intensity is detected, the signal processing unit 6 notifies the control unit 4 of the detection thereof. Upon the notice from the signal processor unit 6, the control unit 4 tries a recovery from the signal absence state or the reduction of signal intensity by switching the directivity direction of the smart antenna 2.

Figure 4:
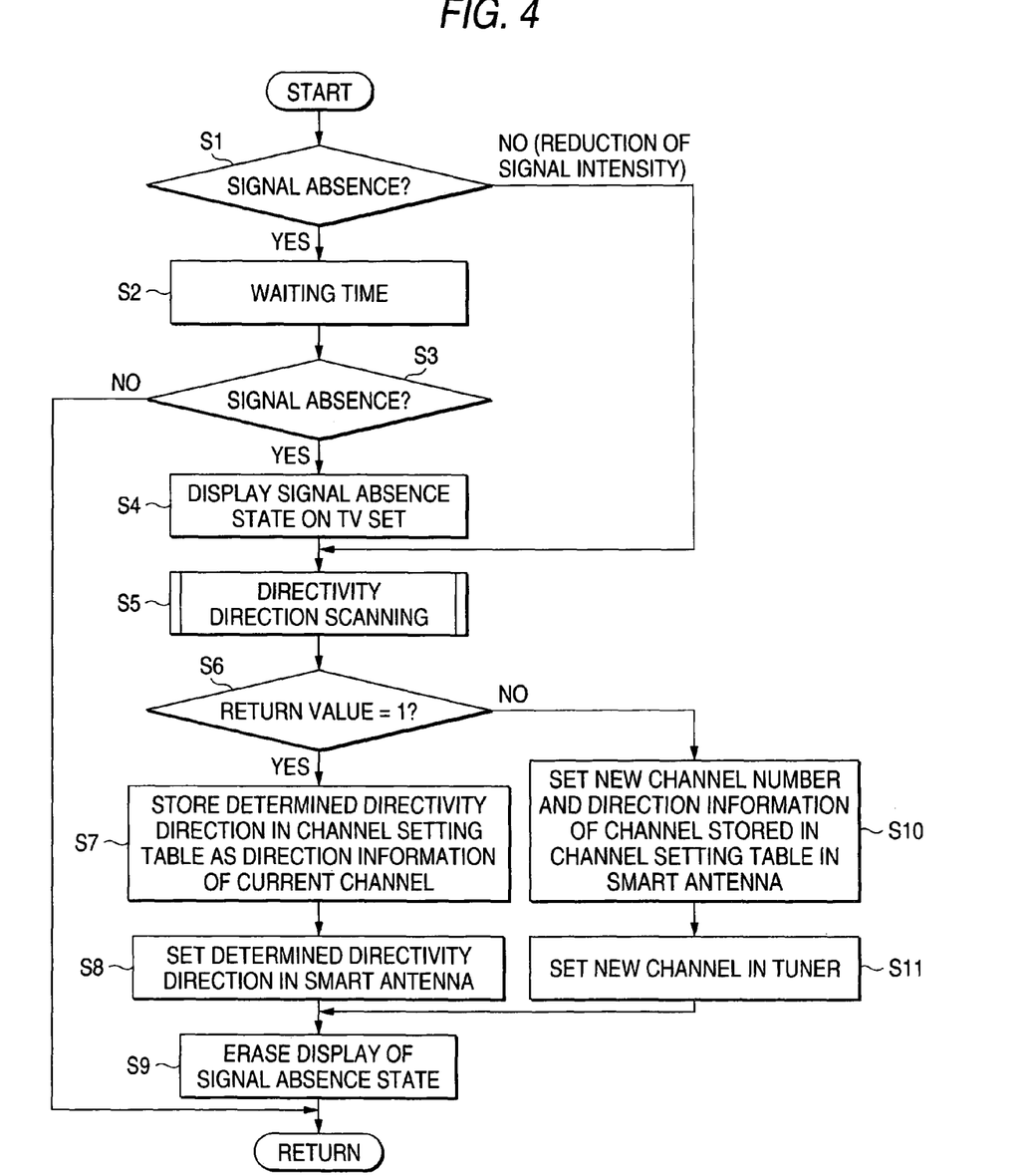
FIG. 4 is a flowchart showing an operation of an embodiment of the present invention.
Figure 5:
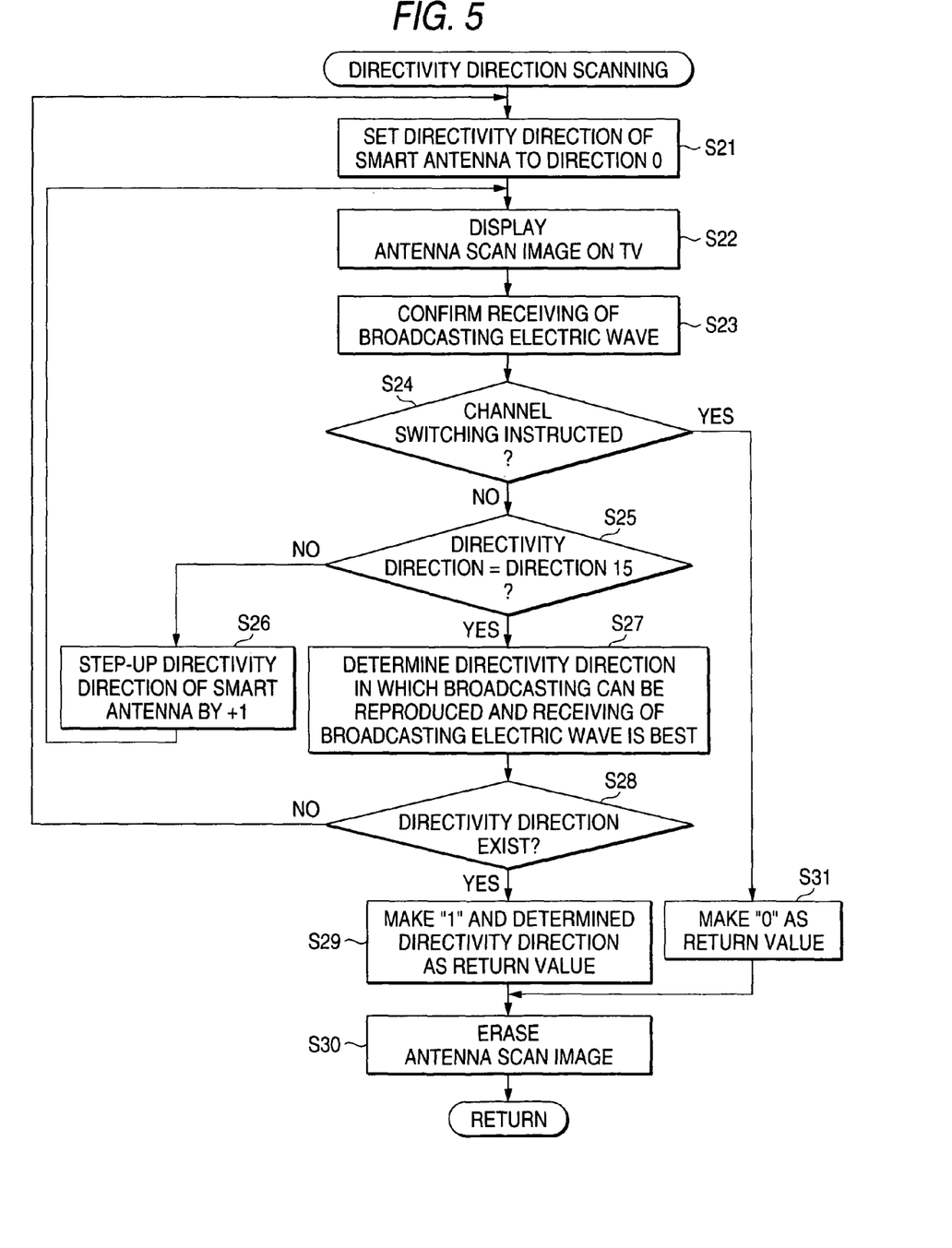
FIG. 5 is a flowchart showing an operation of the embodiment.

FIG. 4 and FIG. 5 are flowcharts showing an operation of a recovery processing from the signal absence state or the reduction of signal intensity. The operation to be described below is realized by executing a program stored in the ROM by the control unit 4. When the signal absence state or the reduction of signal intensity, namely, the badness of the receiving state of the broadcasting signal, is detected, the program shown in FIG. 4 is called and executed. First, in the case where the signal absence state is detected (S1:YES), the control unit 4 waits for a time (for example, about 1 second) (S2) and then confirms whether or not the signal absence state still continues (S3). When the signal absence state disappears (S3:NO), the operation returns to the call step. Since the continuation of signal absence state is confirmed after the waiting time as mentioned, the switching of the directivity direction of the smart antenna 2 to be described later is not performed and the optimal directivity direction of the smart antenna 2 is maintained when the signal absence state occurs in only a short time. Therefore, the user can enjoy a good image of the digital TV broadcasting continuously.

Figure 6:
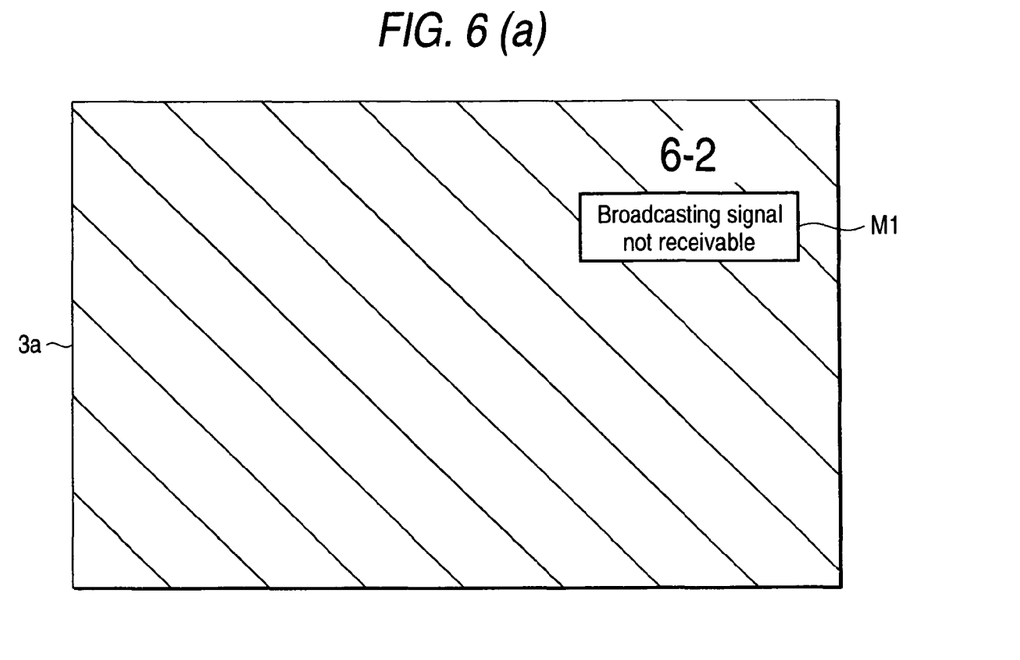
FIG. 6 shows a message to be displayed on a TV set.

On the other hand, when the signal absence state continues (S3:YES), a message of the signal absence state (referred to as "non-signal message", hereinafter) is displayed on the monitor of the TV set 3 as OSD (S4). FIG. 6(*a*) shows a monitor 3*a* of the TV set 3 on which the non-signal message M1 is displayed. In FIG. 6(*a*), a hatched portion shows an image of the digital TV broadcasting. Since, in this time point, the receiving state is the signal absence state, snow noise is displayed on the monitor. Further, "6-2" on the monitor is the channel number of the channel selected. In order to obtain the directivity direction of the smart antenna 2 in which the receiving state is the best, a directivity direction scan routine shown in FIG. 5 is called (S5).

In the directivity direction scan routine, the control unit 4 transmits a control signal for switching the directivity direction to the direction 0 to the smart antenna 2 to set the directivity direction of the smart antenna 2 to the direction 0 (S21). Then, as shown in FIG. 6(*b*), the control unit 4 causes the monitor 3*a* of the TV set 3 to display an antenna scan image M2 as the OSD (S22). The antenna scan image M2 is to show that the directivity direction of the smart antenna is being switched, namely, being scanned. Since, at this time point, the directivity direction is the direction 0, the direction 0 is displayed by a thick line. As described later, when the directivity direction of the smart antenna 2 is switched sequentially, the thick line of the antenna scan image M2 is moved (rotated) correspondingly to the directivity direction. Therefore, the user can visually recognize the sequential switching of the directivity direction of the smart antenna 2.

In the state in which the directivity direction of the smart antenna 2 is set to the direction 0, the control unit 4 performs a confirmation of the receiving of the broadcasting radio wave (S23). In the concrete, the control unit 4 causes the receiving signal level and the bit error rate of the digital TV broadcasting, which are supplied from the signal processor unit 6, to be temporarily stored in the RAM for every directivity direction. Incidentally, when the receiving signal level is equal to or lower than the predetermined reference value, the data of bit error rate is invalid.

At this time point, when the remote controller 11 is operated to instruct a channel switching (S24:YES), it is not necessary to obtain the directivity direction in which the receiving state of the current channel is acceptable. Therefore, the control unit 4 sets "0" as a turning back value from this routine (S31), erases the antenna scan image M2 on the monitor 3*a* (S30) and returns to the call step. That is, the control unit 4 suspends the switching (scanning) of the directivity direction of the smart antenna 2. When there is no channel switching instruction (S24:NO) and the directivity direction of the smart antenna is not the direction 15 (S25:NO), the control unit 4 sets the directivity direction to a value larger than the current direction by 1 (in this case, direction 2) in the smart antenna 2 (S26) and the steps S22 to S24 are repeated until the directivity direction becomes the direction 15. Thus, the directivity direction of the smart antenna 2 is switched (scanned) sequentially to perform the receiving confirmation of the broadcasting wave in all directivity directions.

When the directivity direction of the smart antenna is the direction 15 (S25:YES), that is, when the confirmation of receiving of the broadcasting radio wave in all directivity directions is ended, the control unit 4 determines the directivity direction of the smart antenna 2 in which reproduction of the digital TV broadcasting is possible and the receiving conditions of the broadcasting radiowave is the best (S27). In the concrete, the control unit 4 investigates the receiving signal level and bit error rate in each of 16 directivity directions stored in the RAM and determines a directivity direction in which the receiving signal level is equal to or higher than a predetermined reference value and the bit error rate is minimum as the best (optimal) directivity direction of the smart antenna 2. The "possibility of reproduction" means that an image of the broadcasting signal is displayed on the monitor 3*a* of the TV set 3 in good state.

When there is no optimal directivity direction (that is, no directivity direction satisfying the above mentioned conditions) (S28:NO), the control unit 4 sets the directivity direction of the smart antenna 2 to the direction 0 again (S21) and repeats the above mentioned processing until the optimal directivity direction is found or until the channel switching is instructed. When there is the optimal directivity direction (S28:YES), the control unit 4 uses "1" and the determined directivity direction as return values from this routine (S29), erases the antenna scan image M2 on the monitor 3*a* (S30) and returns to the call step.

Incidentally, in the above description, the optimal directivity direction of the smart antenna 2 is determined on the basis of the receiving signal level and the bit error rate. However, the optimal directivity direction may be determined in a different manner. For example, the optimal directivity direction may be determined by only the receiving signal level. Further, although the optimal directivity direction of the smart antenna 2 is determined after the receiving of the broadcasting radio wave in every directivity direction of the smart antenna is confirmed by switching the directivity direction of the smart antenna 2, it is possible to suspend the scanning of the directivity direction at a time when the directivity direction, in which the digital TV broadcasting is reproducible, is found and the same directivity direction may be determined as the directivity direction for receiving the digital TV broadcasting. That is, in lieu of the optimal directivity direction, a directivity direction, in which the broadcasting signal can be received with a predetermined goodness may be used as the return value from this routine. Further, although the directivity direction is sequentially switched from the direction 0 to the direction 15 in ascending order, it may be possible to switch the directivity direction in a different sequence.

Returning to FIG. 4, when the return value from the directivity direction scan routine is 1 (S6:YES), the control unit 4 stores the directivity direction determined by the directivity direction scan routine in the channel setting table T as the direction information of currently selected channel (S7). Further, the control unit 4 sets the determined directivity direction in the smart antenna 2 (S8). By the steps S7 and S8, an acceptable image of the digital TV broadcasting in the current channel is displayed on the monitor 3a. Then, the control unit 4 erases the display of the signal absence state, that is, the non-signal message Ml, on the monitor 3a (S9) and returns to the call step.

On the other hand, when the return value is 0 (S6:NO), a new channel is selected. Therefore, the control unit 4 sets the channel number of the newly selected channel and the direction information of the new channel, which is stored in the channel setting table T, in the smart antenna 2 (S10). Further, the control unit 4 sets the new channel in the tuner 5 (S11). By the steps S10 and S11, an acceptable image of the digital TV broadcasting in the new channel is displayed on the monitor 3a. Then, the control unit 4 erases the display of the signal absence state, that is, the non-signal message M1 on the monitor 3a (S9) and returns to the call step.

When, in the step S1, the signal absence state is not determined (S1:NO), that is, when the reduction of the signal intensity is detected, the control unit 4 skips the steps S2 to S4 and executes the steps S5 to S11 as in the case when the signal absence state is detected. Since, in this case, the signal absence state (S4) is not displayed, nothing is executed in the step S9. Incidentally, although, in this case, the reduction of signal intensity is not displayed, there is no problem even when the display is performed. Further, it is possible to perform processes similar to the steps S2 and S3, which are performed when the signal absence state is detected.

In the described embodiment, the broadcasting receiver 1 connected to the smart antenna 2 is described. However, the directivity switching antenna is not limited to the smart antenna 2. The present invention can be applied to a broadcast receiver to which, for example, an antenna disclosed in JP-A-11-298226, in which the directivity can be electrically switched between a plurality of directions, or an antenna, in which the directivity is switched by physically rotating an antenna element, is connected.

Further, although, in the disclosed embodiment, the case where the broadcast receiver 1 receives the digital TV broadcasting is described, the present invention can be applied to a case where the analog TV broadcasting, the radio broadcasting or a satellite broadcasting, etc., is received. Incidentally, in a case where the concept of bit error rate of a receiving signal does not exist as in the analog TV broadcasting, the receiving state is determined on the basis of only the receiving signal level. Further, in the described embodiment, although the directivity direction of the smart antenna 2 is scanned in the cases of the signal absence state and the reduction of signal intensity, it is possible to scan the directivity direction in only either of the cases.

What is claimed is:

1. A broadcast receiver for receiving television broadcasting transmitted from a plurality of broadcasting stations through respective receiving channels by a smart antenna having directivity switchable between a plurality of predetermined directivity directions, comprising:
   a control unit for switching the directivity direction of the smart antenna and controlling the broadcast receiver;
   a memory unit for storing a channel information of the respective receiving channels with a corresponding direction information of directivity directions of the smart antenna capable of receiving the television broadcasting of the respective channels; and
   a detector unit for detecting receiving states of broadcasting signals of television broadcasting in the respective receiving channels wherein:
   when any one of the channels stored in the memory is selected, the control unit reads out the direction information of the selected channel from the memory and sets the direction information of the selected channel in the smart antenna;
   the detector unit continuously detects the receiving state of the broadcasting signal in the selected channel while the selected channel is displayed on a television receiver, and is configured to detect a reduction in a signal intensity below a predetermined level of the receiving state of the television broadcasting in the selected channel in a directivity direction corresponded to the direction information set by the control unit,
   the control unit configured to not change the directivity direction during a wait time in a case where the reduction in a signal intensity below a predetermined level is detected, and then to confirm whether or not the reduction in a signal intensity below a predetermined level still continues in the directivity direction corresponded to the direction information set by the control unit,
   when the reduction in a signal intensity below a predetermined level continues the control unit continuously receives the television broadcasting while switching the directivity direction of the smart antenna to determine a directivity direction of the smart antenna, in which the television broadcasting in the selected channel is received with a signal intensity above the predetermined level and, when the directivity direction of the smart antenna is determined, the control unit stores the determined directivity direction in the memory unit as the direction information of the selected channel and sets the direction information of the selected channel in the smart antenna;
   when a new channel is selected in a state where a directivity direction, in which television broadcasting in the channel is received with the signal intensity above the predetermined level, is not determined, the control unit suspends the switching of the directivity direction, reads out the direction information of a new channel from the memory unit and sets the direction information in the smart antenna; and
   in switching the directivity direction, the control unit displays, on the television receiver, that the directivity direction is being switched.

2. A broadcast receiver for receiving broadcasting transmitted from a plurality of broadcasting stations through respective receiving channels by a directivity switching antenna having directivity switchable between a plurality of directivity directions, comprising:
- a control unit for switching the directivity direction of the directivity switching antenna and controlling the broadcast receiver;
- a memory unit for storing a channel information of the respective receiving channels with a corresponding direction information of directivity directions of the directivity switching antenna capable of receiving the television broadcasting of the respective channels; and
- a detector unit for detecting receiving states of broadcasting signals in the respective receiving channels wherein:
- when any one of the channels stored in the memory is selected, the control unit reads out the direction information of the selected channel from the memory and sets the direction information of the selected channel in the directivity switching antenna;
- the detector unit continuously detects the receiving state of the broadcasting signal in the selected channel while the selected channel is displayed on a display unit, and configured to detect a reduction in a signal intensity below a predetermined level of the receiving state of the broadcasting signal in the selected channel in a directivity direction corresponded to the direction information set by the control unit,
- the control unit configured to not change the directivity direction during a wait time in a case where the reduction in a signal intensity below a predetermined level is detected in the directivity direction corresponded to the direction information set b the control unit, and then to confirm whether or not the reduction in the signal intensity below the predetermined level still continues,
- when the reduction in the signal intensity below the predetermined level continues the control unit continuously receives the broadcast signal while switching the directivity direction of the directivity switching antenna to determine a directivity direction of the directivity switching antenna, in which the broadcasting signal in the channel is received with a signal intensity above the predetermined level and, when the directivity direction of the directivity switching antenna is determined, the control unit stores the determined directivity direction in the memory unit as the direction information of the selected channel and sets the direction information of the selected channel in the directivity switching antenna.

3. The broadcast receiver as claimed in claim 2, wherein, in switching the directivity direction of the directivity switching antenna, the control unit displays, on the display unit, that the directivity direction is being switched.

* * * * *